(12) United States Patent
Eom et al.

(10) Patent No.: US 11,988,437 B2
(45) Date of Patent: May 21, 2024

(54) REFRIGERATOR

(71) Applicant: SAMSUNG ELECTRONICS CO., LTD., Suwon-si (KR)

(72) Inventors: Taein Eom, Suwon-si (KR); Hyunuk Park, Suwon-si (KR); Minkyu Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 253 days.

(21) Appl. No.: 17/694,855

(22) Filed: Mar. 15, 2022

(65) Prior Publication Data
US 2022/0196317 A1 Jun. 23, 2022

Related U.S. Application Data

(63) Continuation of application No. PCT/KR2020/010515, filed on Aug. 10, 2020.

(30) Foreign Application Priority Data

Oct. 28, 2019 (KR) .......................... 10-2019-0134356

(51) Int. Cl.
*F25D 23/02* (2006.01)
*F25D 29/00* (2006.01)

(52) U.S. Cl.
CPC ......... *F25D 23/028* (2013.01); *F25D 23/021* (2013.01); *F25D 29/005* (2013.01); *F25D 2400/361* (2013.01)

(58) Field of Classification Search
CPC .... F25D 23/028; F25D 23/021; F25D 29/005; F25D 2400/361; F25D 2400/36; F25D 11/02; G06F 3/041; G06F 3/0412
See application file for complete search history.

(56) References Cited

U.S. PATENT DOCUMENTS 8,035,958 B2 * 10/2011 Kendall ............... H05K 5/0017
361/679.21
11,808,516 B2 * 11/2023 Lee ....................... F25D 23/028
(Continued)

FOREIGN PATENT DOCUMENTS

JP 10-232622 A 9/1998
JP 3341066 B2 11/2002
(Continued)

OTHER PUBLICATIONS

International Search Report for International Application No. PCT/KR020/010515 dated Nov. 30, 2020.
(Continued)

*Primary Examiner* — Hanh V Tran
(74) *Attorney, Agent, or Firm* — STAAS & HALSEY LLP

(57) ABSTRACT

A refrigerator including a sliding plate provided to be slidably moveable and couplable to a front surface of the door, a cover display provided to be rotatable and supported on the sliding plate, a display to which the cover display is couplable to be rotated together with the cover display, a plurality of rotation limitation parts provided to define a rotation range of the cover display, and a release screw provided to allow at least one of the plurality of rotation limitation parts to be adjusted to thereby release a rotation limitation of the defined rotation range of the cover display. As the cover display is being rotated beyond the defined rotation range as the rotation limitation of the cover display is released, the cover display is separated from the sliding plate together with the display and the cover display is no longer supported by the sliding plate.

15 Claims, 13 Drawing Sheets

(56) References Cited

U.S. PATENT DOCUMENTS

| | | | |
|---|---|---|---|
| 2001/0052741 A1* | 12/2001 | Yun | G09F 7/18 |
| | | | 312/405 |
| 2004/0084585 A1* | 5/2004 | Watanabe | F16M 11/105 |
| | | | 248/917 |
| 2004/0149873 A1* | 8/2004 | Ishizaki | F16M 11/2064 |
| | | | 248/274.1 |
| 2005/0041379 A1* | 2/2005 | Jang | F16M 11/045 |
| | | | 248/917 |
| 2006/0125360 A1* | 6/2006 | Kim | F16M 11/2014 |
| | | | 312/405.1 |
| 2007/0262209 A1* | 11/2007 | She | F16M 11/2057 |
| | | | 248/122.1 |
| 2007/0290588 A1* | 12/2007 | Oh | F25D 29/005 |
| | | | 312/401 |
| 2007/0295020 A1* | 12/2007 | Lee | F16M 11/14 |
| | | | 62/331 |
| 2012/0086648 A1* | 4/2012 | Leung | G06F 1/1626 |
| | | | 345/173 |
| 2012/0267491 A1* | 10/2012 | Chiu | F16M 13/00 |
| | | | 248/221.11 |
| 2012/0307456 A1* | 12/2012 | Cao | G06F 1/181 |
| | | | 361/724 |

FOREIGN PATENT DOCUMENTS

| | | | |
|---|---|---|---|
| KR | 20010113400 A | * | 12/2001 |
| KR | 2002-0009818 A | | 2/2002 |
| KR | 10-0534120 B1 | | 12/2005 |
| KR | 10-2006-0062007 A | | 6/2006 |
| KR | 10-0587308 A | | 6/2006 |
| KR | 10-2006-0081921 A | | 7/2006 |
| KR | 10-2007-0055812 A | | 5/2007 |
| KR | 10-0873131 B1 | | 12/2008 |
| KR | 10-1164820 B1 | | 7/2012 |
| KR | 10-1399209 B1 | | 6/2014 |

OTHER PUBLICATIONS

Written Opinion for International Application No. PCT/KR2020//010515 dated Nov. 30, 2020.

* cited by examiner

REFRIGERATOR

CROSS-REFERENCE TO RELATED APPLICATIONS

This application is a continuation application, under 35 U.S.C. § 111(a), of International Patent Application No. PCT/KR2020/010515, filed on Aug. 10, 2020, which claims the claims benefit of priority to Korean Patent Application No. 10-2019-0134356, filed on Oct. 28, 2019, in the Korean Intellectual Property Office, the disclosure of which is incorporated by reference herein in its entirety.

BACKGROUND

1. Field

The present disclosure relates to a refrigerator in which a screen of a display may be switched horizontally or vertically by enabling rotation of the display provided on a door.

2. Description of Related Art

In general, a refrigerator is an electronic apparatus that includes a storage compartment for storing food and a cold air supply device for supplying cold air to the storage compartment to keep food fresh.

The storage compartment is provided with an open front side so that food may be put in and out, and the opened front side may be opened or closed by a door.

Recently, according to the trend of high-tech home appliances, refrigerators provided with displays having input/output functions have been developed and released. Such a display has an output function of visually showing a signal received from the outside or from a controller of a refrigerator through a screen, and an input function of allowing user operation through the display. The display is generally disposed on a front side of the door for the convenience of a user.

The display is assembled in a form of being firmly fixed to the front side of the door. Because rotation of the display is impossible due to this, the screen may not be switched horizontally or vertically to suit the condition of the user.

In addition, although technologies capable of rotating the display have been developed to improve the usability of the fixed display, according to these techniques, the display and a structure for rotating the display are integrated and assembled.

Therefore, the rotation operation of the display may be reliably performed, but it is difficult to separate the display for work such as maintenance of the display.

SUMMARY

An aspect of the present disclosure provides a refrigerator including a main body, a door provided to be rotatably couplable to a front side of the main body, a sliding plate provided to be slidably moveable and couplable to a front surface of the door, a cover display provided to be rotatable and supported on the sliding plate, a display to which the cover display is couplable to be rotated together with the cover display, a plurality of rotation limitation parts provided to define a rotation range of the cover display, and a release screw provided to allow at least one of the plurality of rotation limitation parts to be adjusted to thereby release a rotation limitation of the defined rotation range of the cover display, wherein as the cover display is being rotated beyond the defined rotation range as the rotation limitation of the cover display is released, the cover display is separated from the sliding plate together with the display and the cover display is no longer supported by the sliding plate.

The plurality of rotation limitation parts may include a stopper coupled to a rear surface of the display and a locking jaw provided on the cover display.

The stopper may limit the rotation range such that the cover display is rotated only by 90 degrees in a first direction in a state in which the rotation of the cover display is limited as the locking jaw is caught on the sliding plate.

The locking jaw may limit the rotation range such that the cover display is rotated only by 90 degrees in a second direction opposite to the first direction in a state in which the rotation of the cover display is limited as the stopper is caught on the sliding plate.

The display may include a fastening part provided on the rear surface of the display so that the cover display is fastened thereto, and a stopper receiving part provided on one side of the fastening part to receive the stopper.

The fastening part may be provided to have a shape corresponding to the cover display.

The stopper may be fixed by the release screw in a state of being received in the stopper receiving part.

The stopper receiving part may include an opening provided on one side thereof so that a portion of the stopper protrudes into an inner circumferential surface of the cover display.

When the stopper is fixed by the release screw, the portion of the stopper may protrude into the opening to limit the rotation of the cover display.

When the release screw is separated from the stopper, the stopper may be moved to be received in the stopper receiving part to release the rotation limitation of the cover display.

The cover display may include a separation part to allow the cover display to be separated from the sliding plate and be no longer supported by the sliding plate.

When the stopper releases the rotation limitation of the cover display, the cover display may be rotatable by 90 degrees or more in the first direction, and when the cover display is rotated 90 degrees or more in the first direction, the separation part may be rotated to a position corresponding to the sliding plate, so that the cover display is separated from the sliding plate.

The display may include a plurality of fixing grooves to allow the display to be fixed to the sliding plate when the rotation of the cover display is limited.

The plurality of fixing grooves may include a pair of first fixing grooves to allow the display to be fixed to the sliding plate when the rotation of the cover display is limited by the locking jaw, and a pair of second fixing grooves to allow the display to be fixed to the sliding plate when the rotation of the cover display is limited by the stopper.

The sliding plate may include a pair of fixing parts provided to be fixed to the pair of first fixing grooves or the pair of second fixing grooves when the rotation of the cover display is limited.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
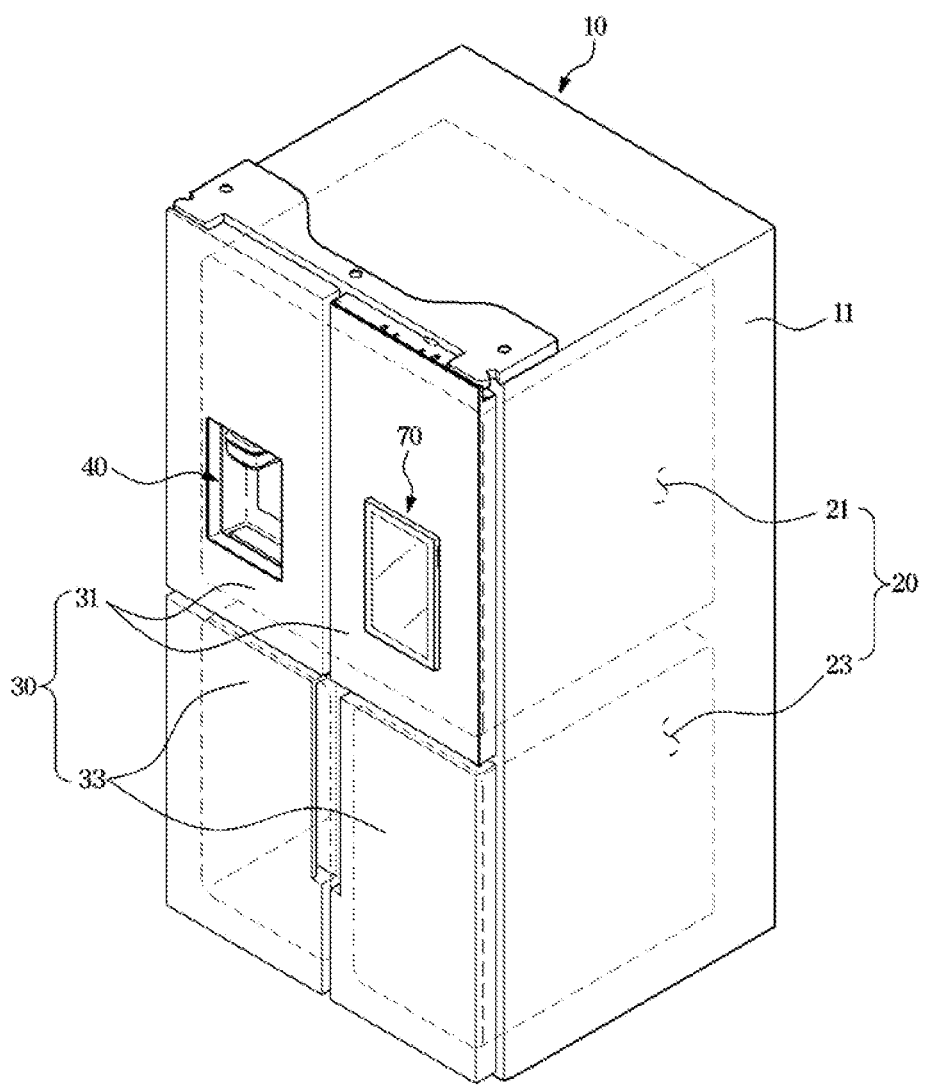
FIG. 1 is a perspective view of a refrigerator according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

In this specification, the terms "front end," "rear end," "upper portion," "lower portion," "upper end" and "lower end" used in the following description are defined with reference to the drawings, and the shape and position of each component are not limited by these terms.

The present disclosure is directed to providing a refrigerator in which a screen of a display may be switched to be horizontal or vertical by enabling rotation of the display as well as the display is detachably installed on a front side of a door.

According to the embodiments of the present disclosure, the convenience of a user can be improved because a screen of a display can be switched to horizontal or vertical.

In addition, the working time required for assembling and disassembling the display can be reduced because the assembly and disassembly of the display is simplified.

Hereinafter, embodiments of the present disclosure will be described in detail with reference to the accompanying drawings.

FIG. 1 is a perspective view of a refrigerator according to an embodiment of the present disclosure.

As illustrated in FIG. 1, a refrigerator may include a main body 10 having a storage compartment 20, and a door 30 coupled to a front side of the main body 10 to open or close an open front side of the storage compartment 20.

The main body 10 may include an inner case (not shown) forming the storage compartment 20, an outer case 11 coupled to an outer side of the inner case to form an exterior of the refrigerator, and an insulator (not shown) provided between the inner case and the outer case 11 to insulate the storage compartment 20.

The inner case may be formed by injection of a plastic material, and the outer case 11 may be formed of a metal material. A urethane foam insulation may be used as the insulator, and a vacuum insulation panel may be used together as necessary.

The main body 10 may include an intermediate wall (not shown), and the storage compartment 20 may be divided into an upper storage compartment 21 and a lower storage compartment 22 by the intermediate wall (not shown). The intermediate wall may include the insulator to insulate the upper storage compartment 21 and the lower storage compartment 22.

The upper storage compartment 21 may be used as a refrigerating compartment for storing food in a refrigerating mode by maintaining indoor air at a temperature of about 0 to 5 degrees Celsius, and the lower storage compartment 22 may be used as a freezing compartment for storing food in a freezing mode by maintaining indoor air at a temperature of about 0 to −30 degrees Celsius.

The storage compartment 20 is provided with an open front side so that food may be put in or out, and the open front side of the storage compartment 20 may be opened or closed by the door 30 which is rotatably provided in front of the storage compartment 20.

The door 30 may include a pair of refrigerating compartment doors 31 for opening or closing the refrigerating compartment 21, which is the upper storage compartment, and a pair of freezing compartment doors 33 for opening or closing the freezing compartment 23, which is the lower storage compartment. A door guard (not shown) may be provided on a rear surface of the door 30 to store food or the like.

A dispenser 40 may be provided on one side of the refrigerating compartment door 31 provided as a pair, and a display 70 may be provided on the other side. The dispenser 40 may be provided in a front surface of the refrigerating compartment door 31 to provide water and ice to a user. The dispenser 40 may be formed to be depressed to receive water and ice.

The display 70 may be provided on the front surface of the refrigerating compartment door 31 to inform the user of information or to enable manipulation by the user. The display 70 may be detachably installed on the front surface of the refrigerating compartment door 31. The display 70 may be rotatably installed on the front surface of the refrigerating compartment door 31. The display 70 may include an output function of visually displaying a signal received from the outside or a refrigerator controller (not shown) through a screen, and an input function of enabling manipulation by the user through the display 70.

Figure 2:
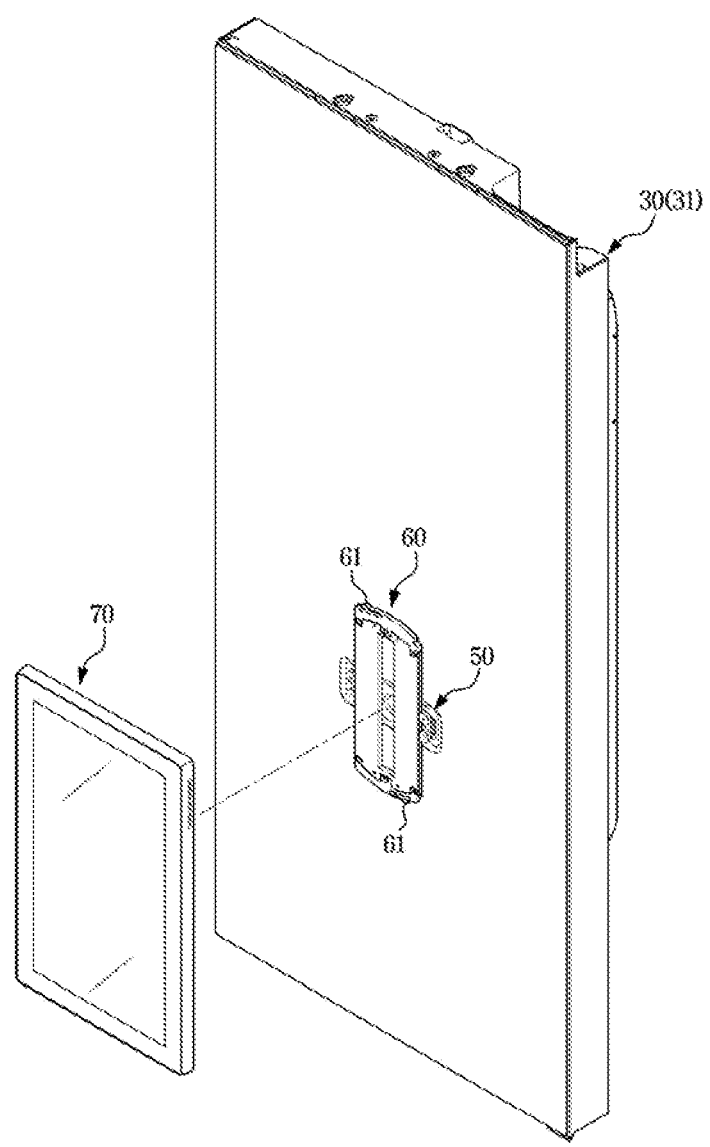
FIG. 2 is a view for explaining a process of assembling a display on a front surface of a refrigerating compartment door according to an embodiment of the present disclosure.
Figure 3:
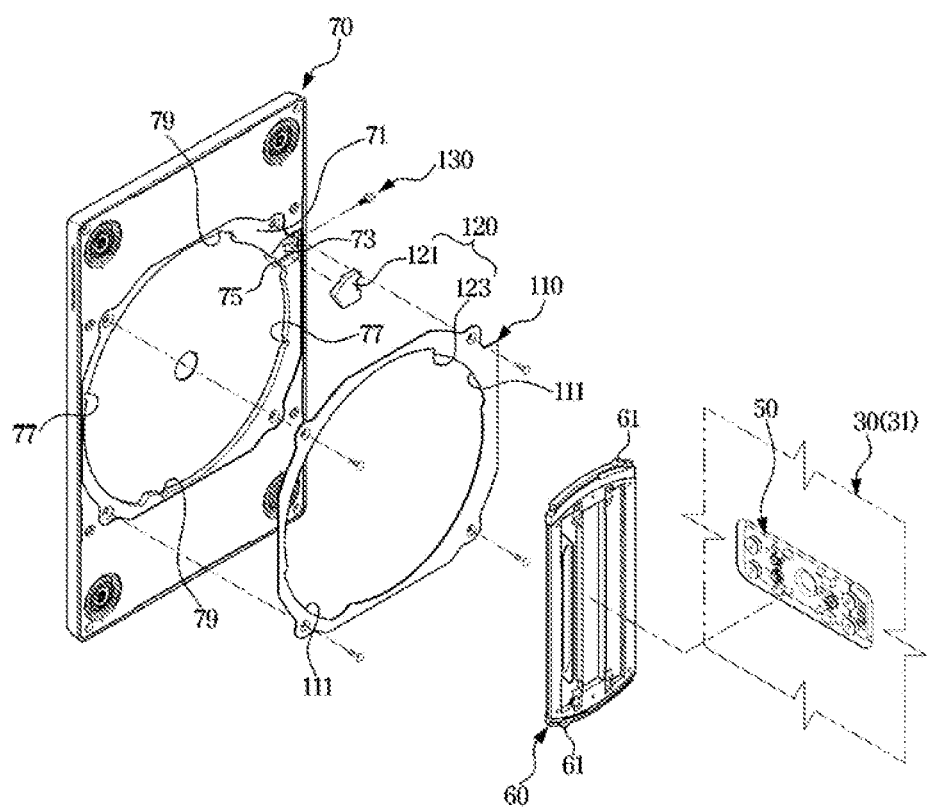
FIG. 3 is an exploded perspective view of a cover display and a sliding plate for assembling the display to be rotatable and detachable on the front surface of the refrigerating compartment door according to an embodiment of the present disclosure.

FIG. 2 is a view for explaining a process of assembling a display on a front surface of a refrigerating compartment door according to an embodiment of the present disclosure. FIG. 3 is an exploded perspective view of a cover display and a sliding plate for assembling the display to be rotatable and detachable on the front surface of the refrigerating compartment door according to an embodiment of the present disclosure.

As illustrated in FIGS. 2 and 3, a bracket 50 may be provided on the front surface of the refrigeration compartment door 31. A sliding plate 60 may be slidably fixed to the bracket 50. The sliding plate 60 may be slidably fixed to the bracket 50 to be movable in a vertical direction. Accordingly, the sliding plate 60 may be slidably fixed to the front surface of the refrigerating compartment door 31 to be movable in the vertical direction.

The display 70 may be assembled on a front surface of the sliding plate 60. A cover display 110 may be fixed to the display 70 by being fastened to a rear surface of the display 70. The cover display 110 may be rotatably supported on the sliding plate 60. Accordingly, the cover display 110 and the display 70 may be rotatably supported on the sliding plate 60.

The sliding plate 60 may include a pair of fixing parts 61 provided such that the display 70 is fixed without being rotated when rotation of the cover display 110 is limited by a plurality of rotation limitation parts 120, which will be described later. The pair of fixing parts 61 may be fixed to a plurality of fixing grooves 77 and 79 provided on the display 70 to prevent rotation of the display 70.

The display 70 may include a fastening part 71 provided on the rear surface of the display 70 so that the cover display 110 is fastened thereto, and a stopper receiving part 73 provided to receive a stopper 121, which will be described later, on one side of the fastening part 71.

The fastening part 71 may be provided to have a shape corresponding to the cover display 110. That is, the fastening part 71 may be provided in a ring shape to correspond to a shape of the cover display 110. The cover display 110 may be fixed to the display 70 by being fastened to the fastening part 71 of the display 70.

The stopper receiving part 73 may be provided on one side of the fastening part 71. The stopper 121 may be received in the stopper receiving part 73. The stopper receiving part 73 may include an opening 75 formed on one side thereof so that a portion of the stopper 121 may protrude into an inner circumferential surface of the cover display 110. The portion of the stopper 121 received in the stopper receiving part 73 may protrude through the opening 75 to be caught on the sliding plate 60 while rotating together with the cover display 110 when the cover display 110 is rotated. That is, a rotation range of the cover display 110 may be limited by the stopper 121 protruding through the opening 75. A detailed description thereof will be given later.

The display 70 may include the plurality of fixing grooves 77 and 79 to which the pair of fixing parts 61 provided on the sliding plate 60 are fixed. The plurality of fixing grooves 77 and 79 may allow the display 70 to be fixed to the sliding plate 60 without being rotated when the rotation of the cover display 110 is limited by the rotation limitation part 120, The plurality of fixing grooves 77 and 79 may include a pair of the first fixing grooves 77 allowing the display 70 to be fixed to the sliding plate 60 when the rotation of the cover display 110 is limited by a locking jaw 123 of the rotation limitation part 120, and a pair of the second fixing grooves 79 allowing the display 70 to be fixed to the sliding plate 60 when the rotation of the cover display 110 is limited by the stopper 121 of the rotation limitation part 120. That is, when the rotation of the cover display 110 is limited by the locking jaw 123, the pair of fixing parts 61 of the sliding plate 60 may be fixed to the pair of first fixing grooves 77. Also, when the rotation of the cover display 110 is limited by the stopper 121, the pair of fixing parts 61 of the sliding plate 60 may be fixed to the pair of second fixing grooves 79.

The cover display 110 may be fixed to the display 70 by being fastened to the fastening part 71 formed on the rear surface of the display 70. The cover display 110 may be rotatably supported on the sliding plate 60. Accordingly, when the cover display 110 is rotated while being supported by the sliding plate 60, the display 70 may also be rotated together with the cover display 110.

The cover display 110 may include a separation part 111 through which the cover display 110 may be separated from the sliding plate 60. The separation part 111 may be provided at a position corresponding to the sliding plate 60 when the cover display 110 is rotated beyond the rotation range limited by the plurality of rotation limitation parts 120. That is, when the cover display 110 is rotated beyond the limited rotation range, the sliding plate 60 is located at a position of the separation part 111, so that the cover display 110 may be separated from the sliding plate 60 through the separation part 111. A pair of the separation parts 111 may be provided at positions facing each other. When the cover display 110 is rotated so that the pair of separation parts 111 are moved to positions corresponding to both vertical ends of the sliding plate 60, the cover display 110 may be separated from the sliding plate 60.

The plurality of rotation limitation parts 120 may be provided to limit the rotation range of the cover display 110. The rotation limitation part 120 may include the stopper 121 coupled to the rear surface of the display 70, and the locking jaw 123 provided on the cover display 110.

The stopper 121 may be received in the stopper receiving part 73 of the display 70. The stopper 121 received in the stopper receiving part 73 may be fixed by a release screw 130. When the stopper 121 is fixed to the release screw 130, a portion of the stopper 121 may protrude through the opening 75.

The portion of the stopper 121 fixed by the release screw 130 may protrude into the inner circumferential surface of the cover display 110 through the opening 75 to limit the rotation range of the cover display 110. That is, the stopper 121 may limit the rotation range such that the cover display 110 may be rotated only by 90 degrees in a first direction in a state in which the rotation of the cover display 110 is limited as the locking jaw 123 is caught on the sliding plate 60. The first direction may be a direction in which the display 70 is rotated to be positioned long in a horizontal direction in a state of being positioned long in the vertical direction. That is, the first direction may be a direction in which the display 70 is rotated counterclockwise when viewed from the front surface of the refrigerating compartment door 31 (see FIG. 6), and may be a direction in which the display 70 is rotated clockwise when viewed from a rear surface of the refrigerating compartment door 31 (see FIG. 7). That is, when the display 70 is rotated 90 degrees in the first direction in the state in which the rotation is limited by the locking jaw 123, the display 70 may not be further rotated in the first direction as the rotation is limited by the stopper 121.

When the stopper 121 is released by loosening the release screw 130, the stopper 121 may be in a movable state. At this time, the stopper 121 may be moved to be entirely received in the stopper receiving part 73. That is, the stopper 121 may be entirely received in the stopper receiving part 73 through the opening 75 without protrusion. That is, when the stopper 121 is released, the cover display 110 may be rotated 90 degrees or more in the first direction. When the cover display 110 is rotated 90 degrees or more in the first direction, the cover display 110 may be rotated to a position where the separation part 111 corresponds to the sliding plate 60 so that the cover display 110 may be separated from the sliding plate 60.

The locking jaw 123 may be provided on the cover display 110. The locking jaw 123 may limit the rotation range of the cover display 110. The locking jaw 123 may limit the rotation range such that the cover display 110 may be rotated only by 90 degrees in the second direction in the state in which the rotation of the cover display 110 is limited as the stopper 121 is caught on the sliding plate 60. The second direction may be a direction opposite to the first direction. The second direction may be a direction in which the display 70 is rotated to be positioned long in the vertical direction in a state of being positioned long in the horizontal direction. That is, when the display 70 is rotated 90 degrees in the second direction in the state in which the rotation is limited by the stopper 121, the display 70 may not be further rotated in the second direction as the rotation is limited by the locking jaw 123.

The release screw 130 may fix the stopper 121 received in the stopper receiving part 73. As described above, the stopper 121 fixed by the release screw 130 may limit the rotation range of the cover display 110 as the portion of the stopper 121 protrudes into the opening 75. It may be appropriate that a left-hand thread is applied to the release screw 130. That is, when the release screw 130 is rotated to the left, the stopper 121 may be fixed, and when the release screw 130 is rotated to the right, the stopper 121 may be released. The release screw 130 for fixing and releasing the stopper 121 is just one example, but is not limited thereto. That is, as long as the stopper 121 may be fixed and released, any structure may be used.

Hereinafter, an operation of rotating the display 70 will be described in detail.

Figure 4:
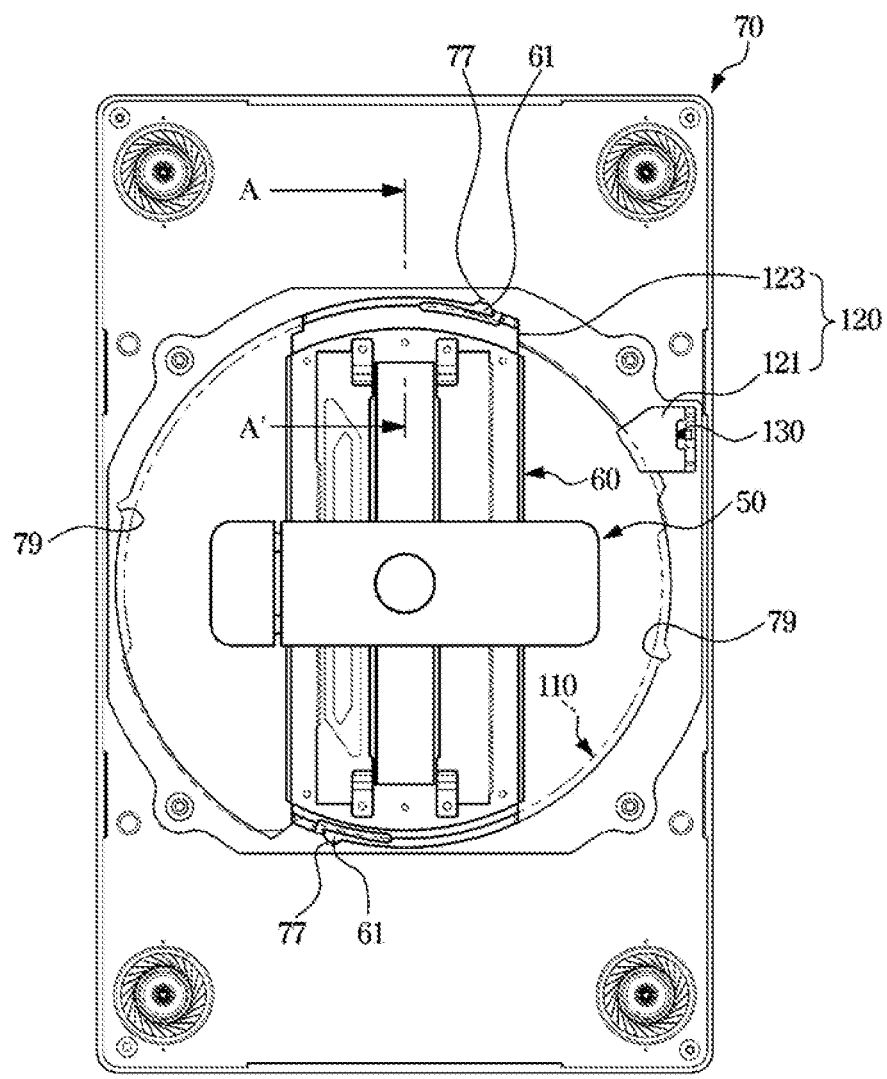
FIG. 4 is a rear view illustrating a state in which the display according to an embodiment of the present disclosure is positioned long in a vertical direction.
Figure 5:
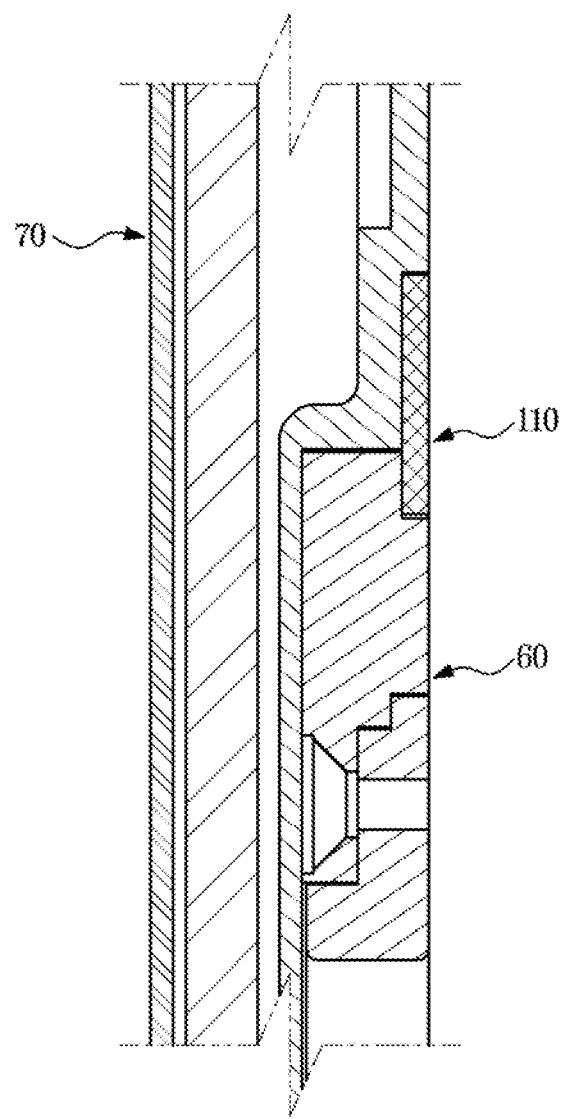
FIG. 5 is a cross-sectional view taken along line A-A in FIG. 4.
Figure 6:
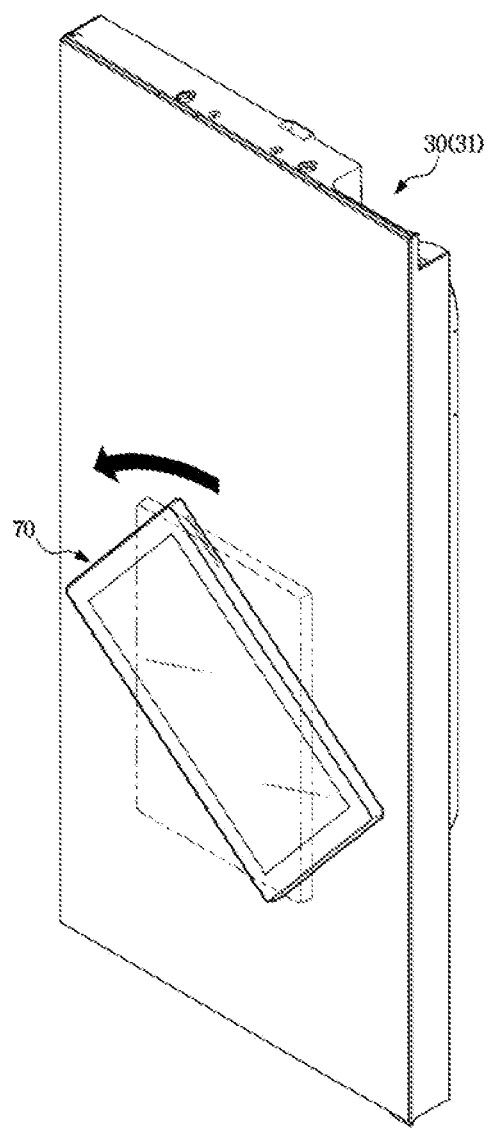
FIG. 6 is a view illustrating an operation in which the display is rotated in a first direction from the state of being positioned long in the vertical direction according to an embodiment of the present disclosure.
Figure 7:
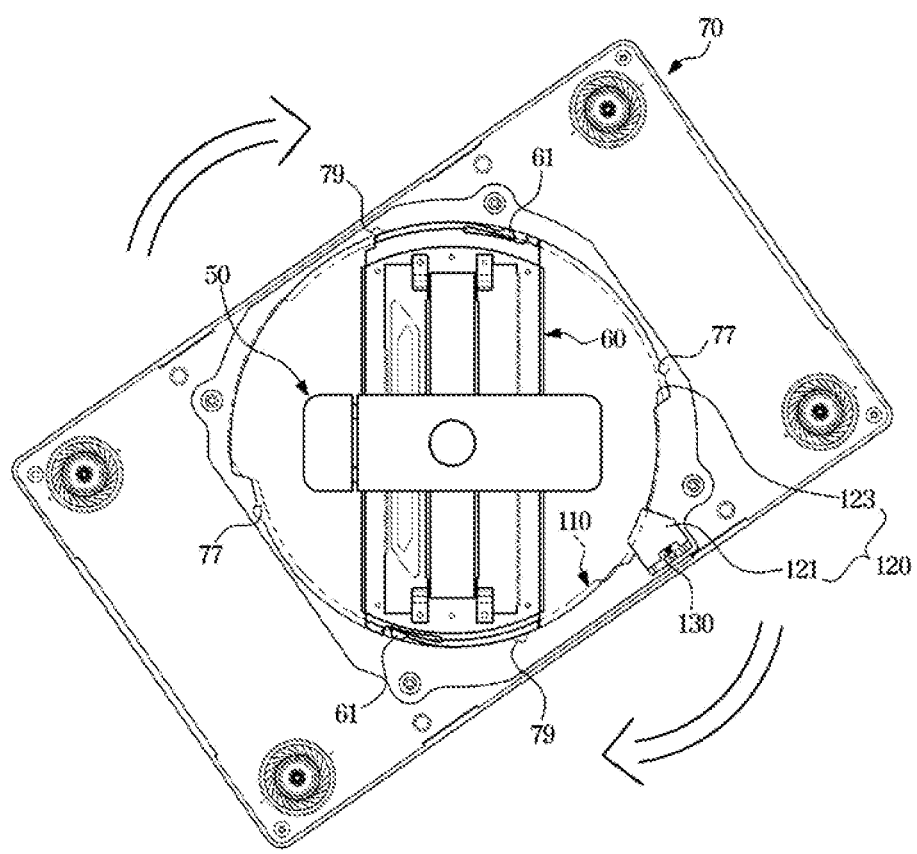
FIG. 7 is a rear view illustrating the operation in which the display is rotated in the first direction from the state of being positioned long in the vertical direction according to an embodiment of the present disclosure.
Figure 8:
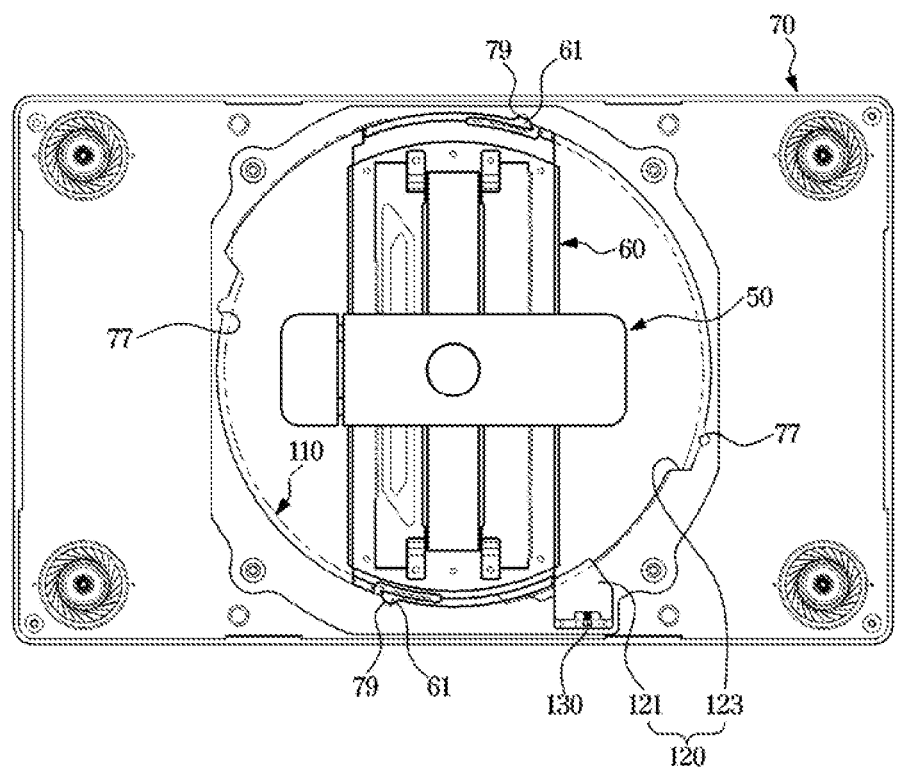
FIG. 8 is a rear view illustrating a state in which the display is rotated to be positioned long in a horizontal direction according to an embodiment of the present disclosure.

FIG. 4 is a rear view illustrating a state in which the display according to an embodiment of the present disclosure is positioned long in a vertical direction. FIG. 5 is a cross-sectional view taken along line A-A in FIG. 4. FIG. 6 is a view illustrating an operation in which the display is rotated in a first direction from the state of being positioned long in the vertical direction according to an embodiment of the present disclosure. FIG. 7 is a rear view illustrating the operation in which the display is rotated in the first direction from the state of being positioned long in the vertical direction according to an embodiment of the present disclosure. FIG. 8 is a rear view illustrating a state in which the display is rotated to be positioned long in a horizontal direction according to an embodiment of the present disclosure.

As illustrated in FIG. 4, the rotation of the cover display 110 is limited by the locking jaw 123 in a state in which the display 70 is positioned long in the vertical direction, so that the rotation of the display 70 in the second direction may be limited. At this time, the pair of fixing parts 61 formed on the sliding plate 60 may be fixed to the pair of first fixing grooves 77 formed on the display 70. As illustrated in FIG. 5, because the cover display 110 is rotatably supported on the sliding plate 60, the cover display 110 may be prevented from being separated from the sliding plate 60.

In the state in which the cover display 110 is limited from rotating in the second direction by the locking jaw 123, the display 70 may be rotated in the first direction as illustrated in FIG. 6. That is, as illustrated in FIG. 7, the cover display 110 fixed to the rear surface of the display 70 may be rotated in the first direction. At this time, the pair of fixing parts 61 formed on the sliding plate 60 may be released from the pair of first fixing grooves 77 formed on the display 70. Because the cover display 110 is rotatably supported on the sliding plate 60, the cover display 110 may be prevented from being separated from the sliding plate 60 when the cover display 110 is rotated (see FIG. 5).

As illustrated in FIG. 8, when the cover display 110 is rotated by 90 degrees in the first direction, the rotation of the cover display 110 may be limited by the stopper 121. That is, when the rotation of the cover display 110 is prevented by the stopper 121, the display 70 may be in the state of being positioned long in the horizontal direction. At this time, the pair of fixing parts 61 formed on the sliding plate 60 may be fixed to the pair of second fixing grooves 79 formed on the display 70. Because the cover display 110 is rotatably supported on the sliding plate 60, the cover display 110 may be prevented from being separated from the sliding plate 60 (see FIG. 5).

That is, because the display 70 may be rotated only by 90 degrees in the first direction or the second direction, the display 70 may be fixed in the state in which the display 70 is positioned long in the vertical or horizontal direction.

Hereinafter, an operation of separating the display 70 from the sliding plate 60 will be described.

Figure 9:
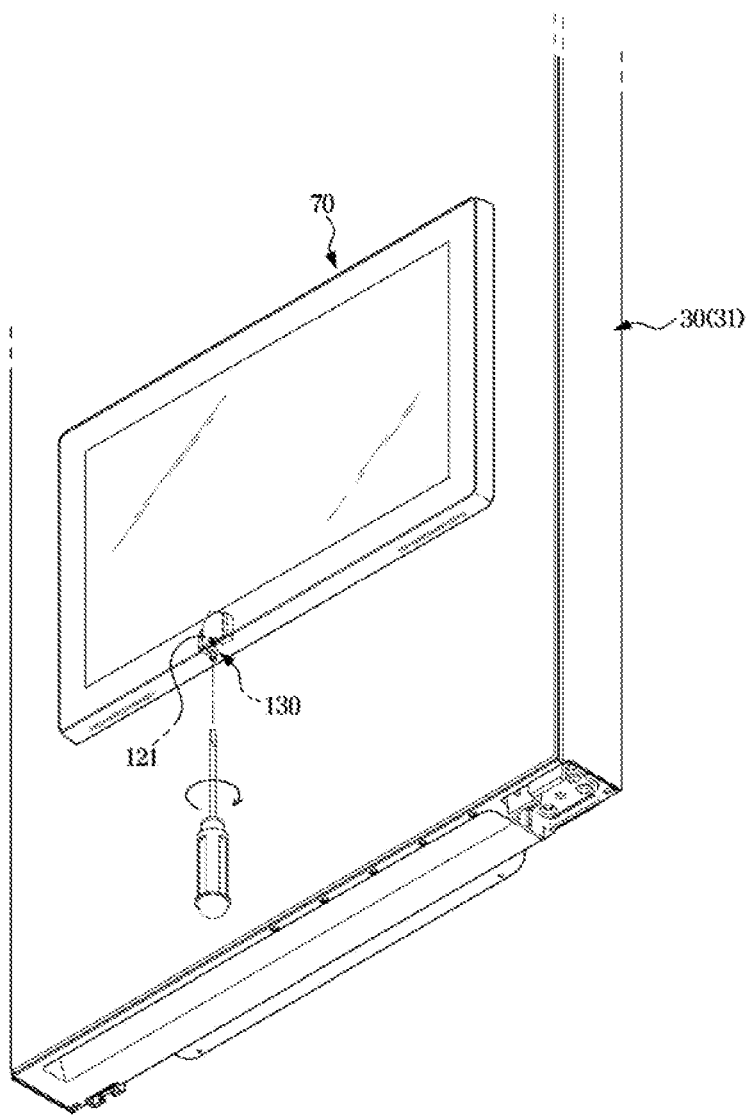
FIG. 9 is a view illustrating an operation in which a release screw is separated from a stopper according to an embodiment of the present disclosure.
Figure 10:
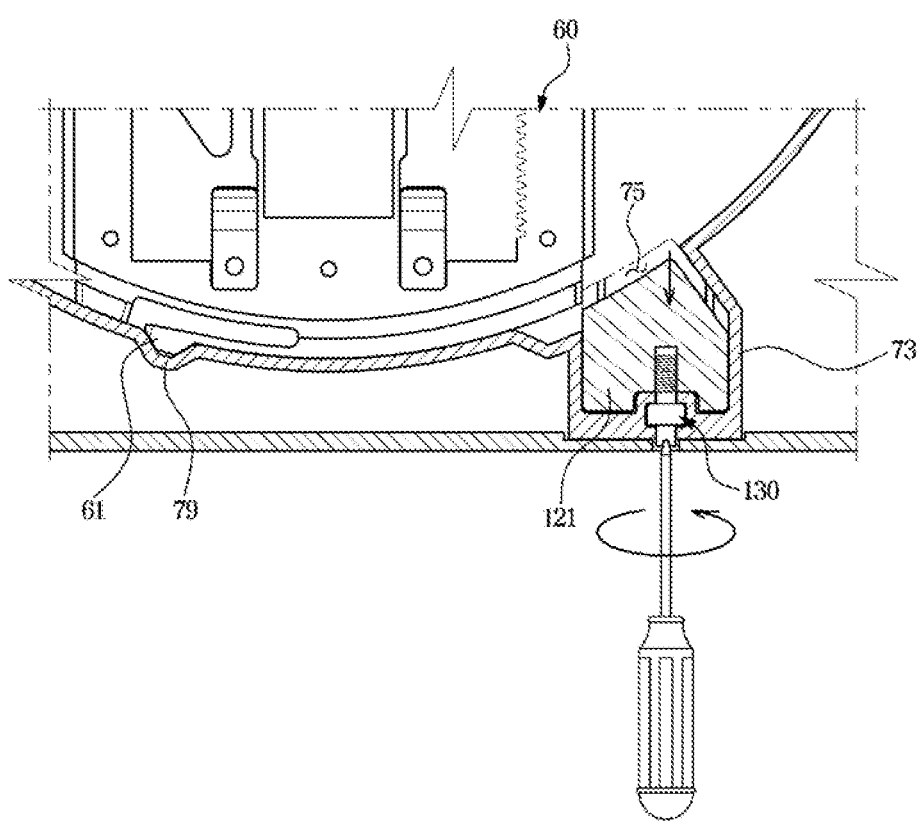
FIG. 10 is a view illustrating a state in which the released stopper is moved to be entirely accommodated in a stopper receiving part according to an embodiment of the present disclosure.
Figure 11:
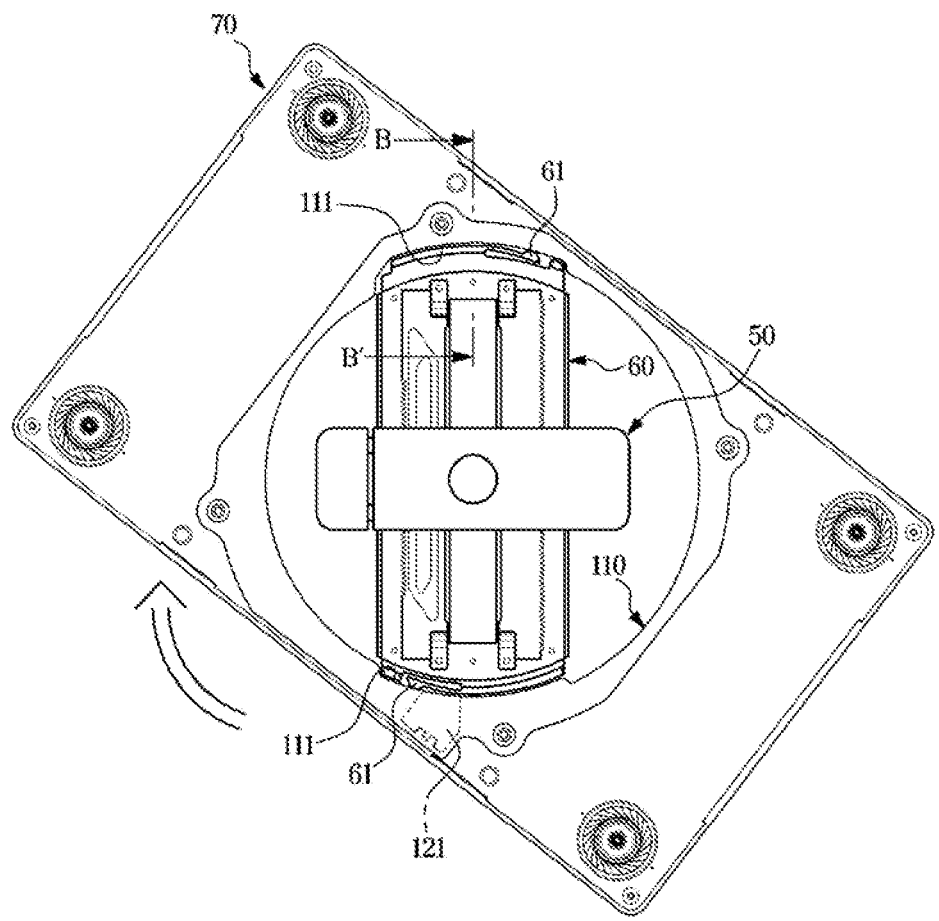
FIG. 11 is a view illustrating a state in which a rotation limitation of the cover display by the stopper is released so that a separation part of the cover display is rotated to a position corresponding to the sliding plate according to an embodiment of the present disclosure.
Figure 12:
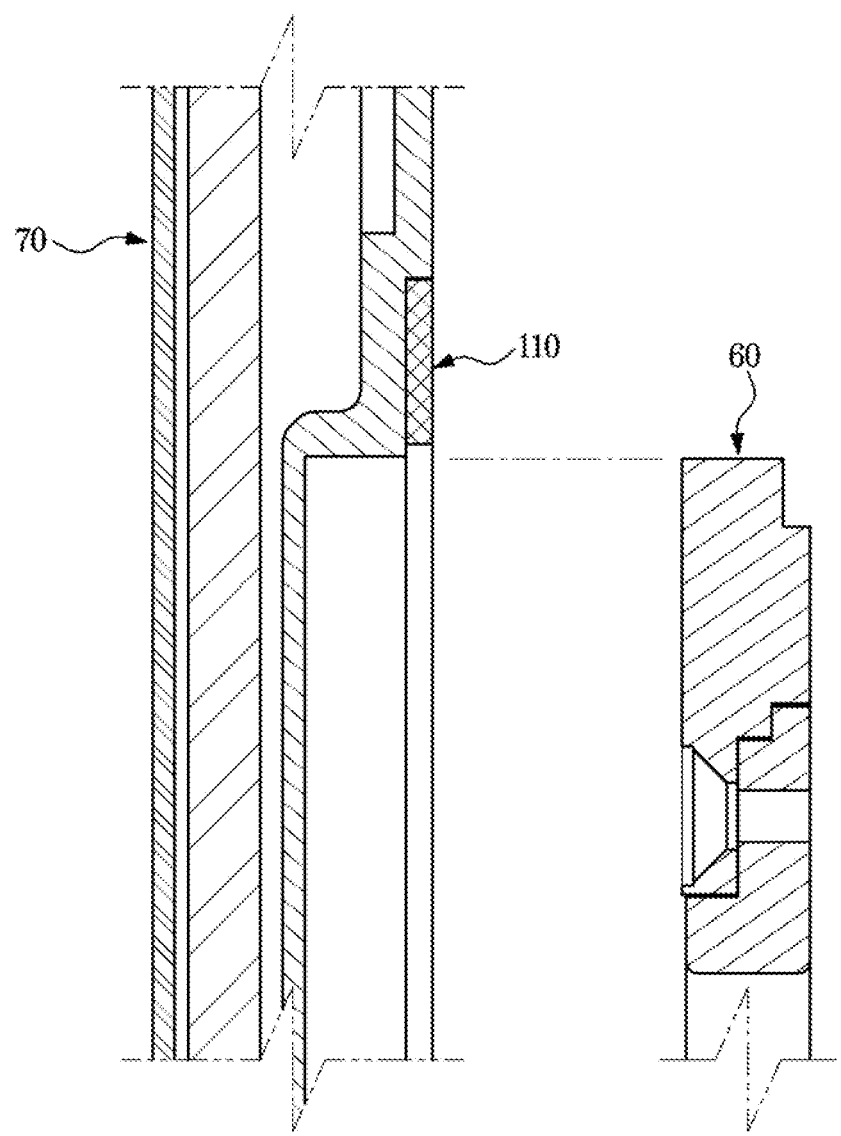
FIG. 12 is a cross-sectional view illustrating a state in which the separation part of the cover display according to an embodiment of the present disclosure is rotated to the position corresponding to the sliding plate so that the display and the cover display are separated from the sliding plate.
Figure 13:
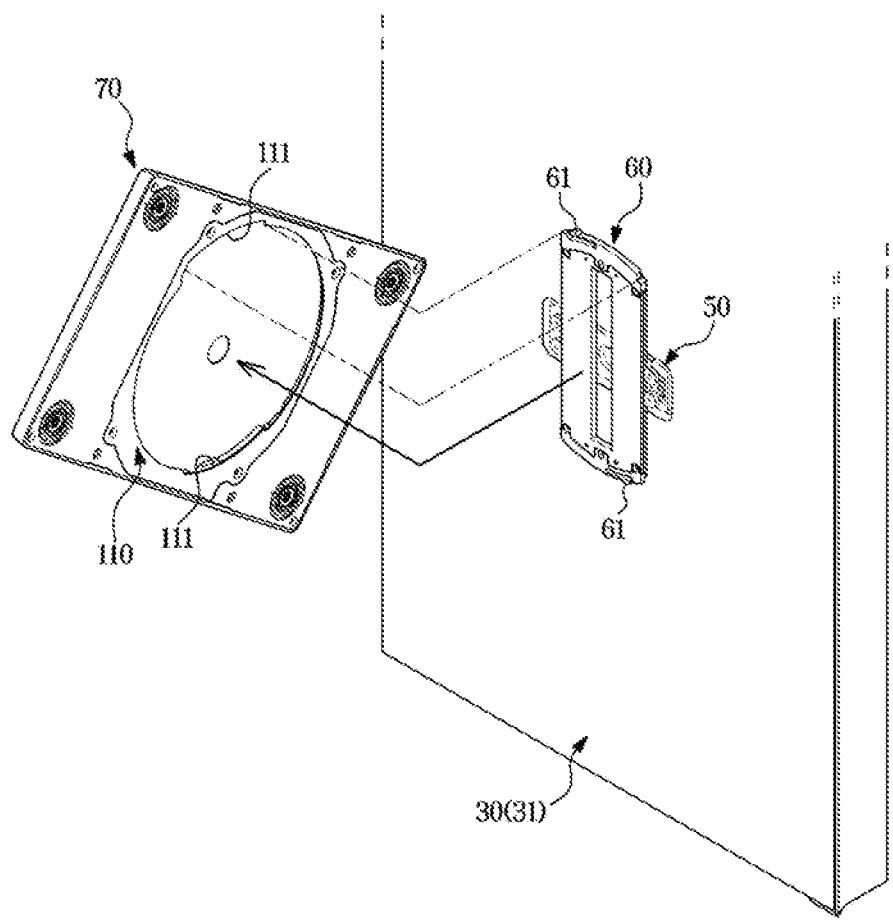
FIG. 13 is a view illustrating a state in which the display according to an embodiment of the present disclosure is separated from the front side of the refrigerating compartment door.

FIG. 9 is a view illustrating an operation in which a release screw is separated from a stopper according to an embodiment of the present disclosure. FIG. 10 is a view illustrating a state in which the released stopper is moved to be entirely accommodated in a stopper receiving part according to an embodiment of the present disclosure. FIG. 11 is a view illustrating a state in which a rotation limitation of the cover display by the stopper is released so that a separation part of the cover display is rotated to a position corresponding to the sliding plate according to an embodiment of the present disclosure. FIG. 12 is a cross-sectional view illustrating a state in which the separation part of the cover display according to an embodiment of the present disclosure is rotated to the position corresponding to the sliding plate so that the display and the cover display are separated from the sliding plate. FIG. 13 is a view illustrating a state in which the display according to an embodiment of the present disclosure is separated from the front side of the refrigerating compartment door.

As illustrated in FIG. 9, when the release screw 130 is rotated to the right, the release screw 130 may be separated from the stopper 121 to release the stopper 121.

When the stopper 121 is released, as illustrated in FIG. 10, the stopper 121 partially protruding through the opening 75 may be moved to be entirely received inside the stopper receiving part 73. Because the rotation limitation of the cover display 110 by the stopper 121 is released when the stopper 121 is entirely received inside the stopper receiving part 73, as illustrated in FIG. 11, the cover display 110 may be further rotated in the first direction. That is, the cover display 110 may be rotated 90 degrees or more in the first direction in the state in which the rotation is limited by being caught on the locking jaw 123. When the cover display 110 is rotated 90 degrees or more in the first direction, the separation part 111 of the cover display 110 may be rotated to a position corresponding to the sliding plate 60. When the separation part 111 of the cover display 110 is rotated to the position corresponding to the sliding plate 60, the cover display 110 may be in the state of being separated from the sliding plate 60.

That is, as illustrated in FIG. 12, when the separation part 111 of the cover display 110 is rotated to the position corresponding to the sliding plate 60, the cover display 110 may not be supported on the sliding plate 60.

When the cover display 110 is not supported on the sliding plate 60, as illustrated in FIG. 13, the display 70 and the cover display 110 may be separated from the sliding plate 60.

While the present disclosure has been particularly described with reference to exemplary embodiments, it should be understood by those of skilled in the art that various changes in form and details may be made without departing from the spirit and scope of the present disclosure.

What is claimed is:

1. A refrigerator comprising:
   a main body;
   a door provided to be rotatably couplable to a front side of the main body;
   a sliding plate provided to be slidably moveable and couplable to a front surface of the door;
   a cover display provided to be rotatable and supported on the sliding plate;
   a display to which the cover display is couplable to be rotated together with the cover display;
   a plurality of rotation limitation parts provided to define a rotation range of the cover display; and
   a release screw provided to allow at least one of the plurality of rotation limitation parts to be adjusted to thereby release a rotation limitation of the defined rotation range of the cover display,
   wherein as the cover display is being rotated beyond the defined rotation range as the rotation limitation of the cover display is released, the cover display is separated from the sliding plate together with the display and the cover display is no longer supported by the sliding plate.

2. The refrigerator according to claim 1, wherein
   the plurality of rotation limitation parts comprise a stopper couplable to a rear surface of the display and a locking jaw provided on the cover display.

3. The refrigerator according to claim 2, wherein
   the stopper limits the rotation range such that the cover display is rotated only by 90 degrees in a direction in a state in which a rotation of the cover display is limited as the locking jaw is caught on the sliding plate.

4. The refrigerator according to claim 3, wherein the direction is a first direction, and
   the locking jaw limits the rotation range such that the cover display is rotated only by 90 degrees in a second direction opposite to the first direction in a state in which the rotation of the cover display is limited as the stopper is caught on the sliding plate.

5. The refrigerator according to claim 4, wherein
   the display comprises a fastening part provided on the rear surface of the display so that the cover display is fastened thereto, and a stopper receiving part provided on one side of the fastening part to receive the stopper.

6. The refrigerator according to claim 5, wherein
   the fastening part is provided to have a shape corresponding to the cover display.

7. The refrigerator according to claim 5, wherein
   the stopper is fixed by the release screw in a state of being received in the stopper receiving part.

8. The refrigerator according to claim 7, wherein
   the stopper receiving part comprises an opening provided on one side thereof so that a portion of the stopper protrudes into an inner circumferential surface of the cover display.

9. The refrigerator according to claim 8, wherein
   while the stopper is fixed by the release screw, the portion of the stopper protrudes into the opening to limit the rotation of the cover display.

10. The refrigerator according to claim 9, wherein
    while the release screw is separated from the stopper, the stopper is moved to be received in the stopper receiving part to release the rotation limitation of the cover display.

11. The refrigerator according to claim 10, wherein
    the cover display comprises a separation part to allow the cover display to be separated from the sliding plate and be no longer supported by the sliding plate.

12. The refrigerator according to claim 11, wherein
    when the stopper releases the rotation limitation of the cover display, the cover display is rotatable by 90 degrees or more in the first direction, and when the cover display is rotated 90 degrees or more in the first direction, the separation part is rotated to a position corresponding to the sliding plate, so that the cover display is separated from the sliding plate.

13. The refrigerator according to claim 4, wherein
    the display comprises a plurality of fixing grooves to allow the display to be fixed to the sliding plate when the rotation of the cover display is limited.

14. The refrigerator according to claim 13, wherein
    the plurality of fixing grooves comprises a pair of first fixing grooves to allow the display to be fixed to the sliding plate when the rotation of the cover display is limited by the locking jaw, and a pair of second fixing grooves to allow the display to be fixed to the sliding plate when the rotation of the cover display is limited by the stopper.

15. The refrigerator according to claim 14, wherein
the sliding plate comprises a pair of fixing parts provided
to be fixed to the pair of first fixing grooves or the pair
of second fixing grooves when the rotation of the cover
display is limited.

* * * * *